United States Patent
Kuzuyama et al.

(10) Patent No.: US 7,739,026 B2
(45) Date of Patent: Jun. 15, 2010

(54) CONTROL APPARATUS FOR COMBUSTION ENGINE OF PREMIXED COMPRESSION SELF-IGNITION TYPE

(75) Inventors: Hiroshi Kuzuyama, Aichi (JP); Masahiro Machida, Aichi (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 305 days.

(21) Appl. No.: 11/992,505

(22) PCT Filed: Dec. 18, 2006

(86) PCT No.: PCT/JP2006/325168

§ 371 (c)(1),
(2), (4) Date: Mar. 24, 2008

(87) PCT Pub. No.: WO2007/083468

PCT Pub. Date: Jul. 26, 2007

(65) Prior Publication Data

US 2009/0248271 A1    Oct. 1, 2009

(30) Foreign Application Priority Data

Jan. 23, 2006  (JP) .............................. 2006-014070

(51) Int. Cl.
*F02M 25/07* (2006.01)
*F02B 47/08* (2006.01)
*F02B 33/44* (2006.01)
*G06F 19/00* (2006.01)

(52) U.S. Cl. ........................ 701/108; 701/103; 701/110; 123/564; 123/568.14; 123/568.21; 60/605.2

(58) Field of Classification Search .............. 123/90.11, 123/90.15–90.18, 568.11, 568.14, 568.21, 123/559.1, 564; 701/101–103, 108, 110, 701/114, 115; 60/602, 605.2
See application file for complete search history.

(56) References Cited

U.S. PATENT DOCUMENTS 6,626,164 B2 *  9/2003  Hitomi et al. .......... 123/568.14

(Continued)

FOREIGN PATENT DOCUMENTS

JP    2000-220484    8/2000

(Continued)

OTHER PUBLICATIONS

First Office Action for Patent Application No. 200680051621.6, dated Nov. 27, 2009 and English translation.
International Search Report of corresponding International Application No. PCT/JP2006/325168, mailed Feb. 13, 2007.
Copy of Japanese Official Notification in counterpart Japanese Application No. 2006-014070 dated Mar. 12, 2010.

*Primary Examiner*—Willis R Wolfe, Jr.
(74) *Attorney, Agent, or Firm*—Locke Lord Bissell & Liddell LLP (57) ABSTRACT

At high temperature, namely, when the temperature of intake air is higher than a predetermined normal temperature range, an ECU (25) controls a variable valve timing mechanism (24) such that the timing for closing an exhaust valve (9) is adjusted to a retard side, thereby reducing the amount of high-temperature internal EGR gas to avoid the occurrence of pre-ignition. At intermediate load and high load, the ECU (25) makes the retard amount of the timing for closing the exhaust valve (9) larger than that at low load, thereby reducing the amount of internal EGR gas. At intermediate load and in an intermediate-revolution range or a high-revolution range, the rotating speed of an electric motor (16) is increased to raise a supercharging pressure exerted by a supercharger (17). At high load and in the high-revolution range, the electric motor (16) for the supercharger (17) and an EGR control valve (22) are controlled such that the supercharging pressure rises and the amount of external EGR gas increases as the temperature of intake air detected by a temperature sensor (26) rises.

7 Claims, 6 Drawing Sheets

U.S. PATENT DOCUMENTS

| | | | |
|---|---|---|---|
| 6,772,742 B2 * | 8/2004 | Lei et al. | 123/568.14 |
| 6,899,090 B2 | 5/2005 | Arnold | |
| 7,066,158 B2 * | 6/2006 | Kuzuyama | 60/605.2 |
| 7,347,178 B2 * | 3/2008 | Caine et al. | 123/90.15 |
| 2001/0027783 A1 | 10/2001 | Hiraya et al. | |
| 2002/0040708 A1 | 4/2002 | Chmela et al. | |
| 2002/0069859 A1 | 6/2002 | Hasegawa et al. | |
| 2003/0196646 A1 * | 10/2003 | Shoyama et al. | 123/568.14 |

FOREIGN PATENT DOCUMENTS

| | | |
|---|---|---|
| JP | 2001-280165 | 10/2001 |
| JP | 2001-289092 | 10/2001 |
| JP | 2002-180864 | 6/2002 |
| JP | 2004-211688 | 7/2004 |
| JP | 2005-090468 A | 4/2005 |
| JP | 2005-207342 | 8/2005 |
| JP | 2005-220891 | 8/2005 |

* cited by examiner

CONTROL APPARATUS FOR COMBUSTION ENGINE OF PREMIXED COMPRESSION SELF-IGNITION TYPE

TECHNICAL FIELD OF THE INVENTION

The present invention relates to a control apparatus for a combustion engine of a premixed compression self-ignition type, and more particularly, to a control apparatus for a combustion engine of a premixed compression self-ignition type equipped with a supercharger and an external EGR (exhaust gas recirculation) mechanism.

BACKGROUND ART OF THE INVENTION

In recent years, internal combustion engines employing a premixed compression self-ignition combustion method, in which an air-fuel mixture is compressed to cause self-ignition thereof, have been drawing attention. The internal combustion engines employing the premixed compression self-ignition combustion method are known to exhibit better performances in points of improved fuel consumption, NOx reduction, and the like than that of the conventional internal combustion engines employing a diffusion combustion method or a flame propagation combustion method.

The conventional internal combustion engine employing the premixed compression self-ignition combustion method is disclosed in, for example, Patent Document 1. In the internal combustion engine described in Patent Document 1, as illustrated by a map indicating a relation between a load and a revolution number, the premixed compression self-ignition combustion is selected to be performed on a low-revolution/low-load side, and jump spark ignition combustion is selected to be performed on a high-revolution/high-load side. During the premixed compression self-ignition combustion, a sealing period in which both an intake valve and an exhaust valve are closed is set around an exhaust top dead center to perform internal EGR for causing burnt gas to remain in a combustion chamber, and the timings for opening/closing the intake valve and the exhaust valve are adjusted according to changes in the external environment to ensure stable self-ignition combustion. For example, the sealing period is prolonged as the temperature of intake air drops so that the temperature in the combustion chamber is prevented from dropping in the neighborhood of the exhaust top dead center. It has also been proposed to inject fuel into the combustion chamber during the sealing period to generate a modified substance exhibiting high ignitability.

Patent Document 1: JP 2002-129991 A

DISCLOSURE SUMMARY OF THE INVENTION

Problems to be Solved by the Invention

Stable self-ignition combustion cannot be easily realized on the high-revolution/high-load side by simply adjusting the timings for opening/closing the intake valve and the exhaust valve and injecting fuel during the sealing period as described in Patent Document 1, so a switchover to jump spark ignition combustion is indispensable. As a result, the operational range allowing premixed compression self-ignition combustion is limited. A gasoline engine is assumed to be used in the embodiment of the invention of Patent Document 1. In a case where town gas or the like, which exhibits low ignitability, is used as fuel, the temperature of ignition becomes high, so the above-mentioned tendency is more noticeable. That is, the operational range enabling stable premixed compression self-ignition combustion is defined narrowly.

According to internal EGR and fuel injection during the sealing period as described in Patent Document 1, the ignitability in the combustion chamber can be improved. Accordingly, the timing of ignition and the like on the low-revolution/low-load side can be controlled by adjusting the amount of internal EGR and the generation amount of the modified substance. In a range from an intermediate-revolution/intermediate-load side to the high-revolution/high-load side, however, the amount of fuel supply is increased, so sufficient ignitability is ensured even if the amount of internal EGR is reduced. Also, the amount of fuel supply needs to be increased in accordance with a load so that the available amount of internal EGR is decreased in inverse proportion thereto. Thus, the mere use of the aforementioned means leads to gradual reductions in the range of control on the high-revolution/high-load side and makes it difficult to perform control according to the external environment. Furthermore, on the high-revolution/high-load side where the amount of fuel supply is increased, the temperature in the combustion chamber rises due to a rise in the temperature of intake air, so there is also caused a problem in that the level of combustion noise tends to increase due to sudden combustion. However, the construction described in Patent Document 1 cannot solve such a problem and leads to a result that the range allowing premixed compression self-ignition combustion is defined narrowly.

The present invention has been made to solve the above-mentioned problems, and it is therefore an object of the present invention to provide a control apparatus for a combustion engine of a premixed compression self-ignition type which makes it possible to enlarge an operational range allowing premixed self-ignition combustion toward a high-revolution/high-load side.

Means for Solving the Problems

According to the present invention, there is provided a control apparatus for a combustion engine of a premixed compression self-ignition type, for compressing a mixture of a fuel and an oxygen-containing gas in a combustion chamber to cause combustion thereof through self-ignition, and setting a sealing period during which both an intake valve and an exhaust valve are closed around an exhaust top dead center to cause burnt gas to remain as an internal EGR gas in the combustion chamber, the control apparatus for a combustion engine of a premixed compression self-ignition type including: a temperature sensor for detecting a temperature of intake air; a revolution number sensor for detecting a revolution number of the combustion engine; a load sensor for detecting a magnitude of a load from an operational state of the combustion engine; a supercharger of a variable supercharging pressure type which is disposed in an intake passage; an external EGR mechanism for recirculating part of exhaust gas in an exhaust passage as an external EGR gas to the intake passage at a position upstream of the supercharger; and a control unit for controlling the supercharger and the external EGR mechanism, the control unit grasping a current revolution number and a current magnitude of a load based on a signal from the revolution number sensor and a signal from the load sensor, respectively, and controlling the supercharger and the external EGR mechanism such that a supercharging pressure rises and an amount of the external EGR gas increases as a temperature of intake air detected by the temperature sensor rises when it is determined that the combustion engine is operated in a preset high-revolution/high-load range.

Preferably, the control apparatus for a combustion engine of a premixed compression self-ignition type further includes a variable valve timing mechanism for adjusting timings for opening/closing the exhaust valve, the control unit controlling the variable valve timing mechanism such that timing for closing the exhaust valve is adjusted to an advance side when the temperature of intake air detected by the temperature sensor is lower than a normal temperature, and that the timing for closing the exhaust valve is adjusted to a retard side when the temperature of intake air detected by the temperature sensor is higher than the normal temperature.

Note that, the control apparatus for a combustion engine of a premixed compression self-ignition type can be configured such that the control unit can be designed to control the variable valve timing mechanism such that an advance amount of the timing for closing the exhaust valve becomes smaller during operation in a preset low-load range than during operation in a preset intermediate-load range when the temperature of intake air detected by the temperature sensor is lower than the normal temperature.

Further, the control unit may control the external EGR mechanism such that the amount of the external EGR gas decreases when the temperature of intake air detected by the temperature sensor is lower than a normal temperature and the combustion engine is operated in the high-load range.

Still further, the control unit can be designed to control the variable valve timing mechanism such that a retard amount of the timing for closing the exhaust valve becomes larger during operation in a preset intermediate-load range than during operation in a preset low-load range when the temperature of intake air detected by the temperature sensor is higher than the normal temperature.

EFFECT OF THE INVENTION

According to the present invention, the operational range allowing premixed self-ignition combustion can be enlarged toward the high-revolution/high-load side.

BEST MODE FOR CARRYING OUT DETAILED DESCRIPTION OF THE PREFERRED EMBODIMENTS INVENTION

An embodiment of the present invention will be described hereinafter referring to the accompanying drawings.

Figure 1:
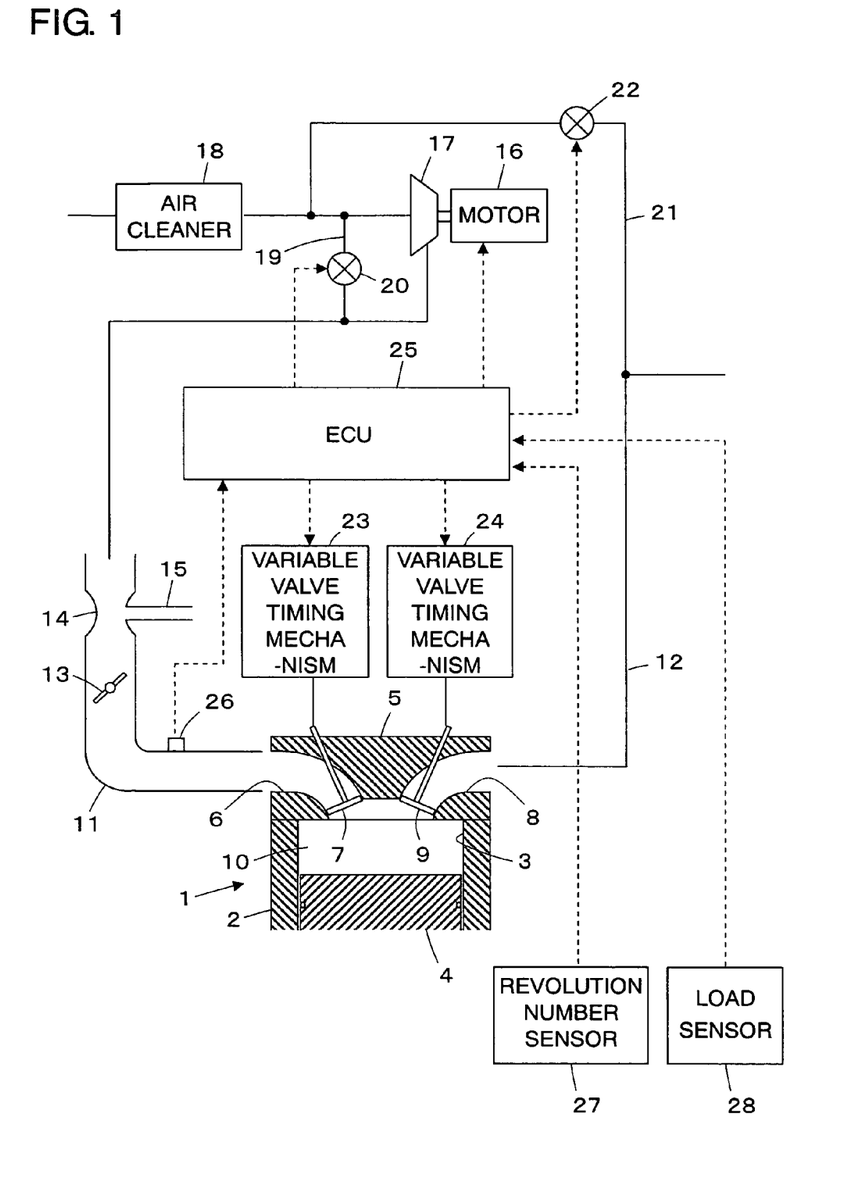
FIG. 1 is a block diagram showing a control apparatus for a combustion engine of a premixed compression self-ignition type according to an embodiment of the present invention.

FIG. 1 shows a construction of a control apparatus for a combustion engine of a premixed compression self-ignition type according to the embodiment of the present invention. An engine 1 has a cylinder block 2. A cylinder bore 3 is formed inside the cylinder block 2, and a piston 4 is disposed reciprocatively and slidably in the cylinder bore 3. A cylinder head 5 in which an intake port 6 and an exhaust port 8 are formed is fixed onto an upper portion of the cylinder block 2. The cylinder head 5 is fitted with an intake valve 7 for opening/closing the intake port 6 and an exhaust valve 9 for opening/closing the exhaust port 8. A combustion chamber 10 is defined by the cylinder bore 3, a top face of the piston 4, and the cylinder head 5. An intake passage 11 is connected to the intake port 6, and an exhaust passage 12 is connected to the exhaust port 8.

A throttle valve 13 is disposed inside the intake passage 11. A fuel supply passage 15 is coupled to a venturi portion 14 formed upstream of the throttle valve 13. A supercharger 17 of a variable supercharging pressure type, which is driven by an electric motor 16, is disposed in the intake passage 11 at a position upstream of the venturi portion 14. An air cleaner 18 is connected to the intake passage 11 at a position further upstream of the supercharger 17. Further, the intake passage 11 has a bypass channel 19, which is formed such that the upstream side of the supercharger 17 communicates with the downstream side of the supercharger 17. A bypass control valve 20 for opening/closing the bypass channel 19 is disposed in the bypass channel 19.

An EGR passage 21 for recirculating exhaust gas is connected at one end thereof to a midway of the exhaust passage 12. The EGR passage 21 is connected at the other end thereof to the intake passage 11 at a position upstream of the supercharger 17. An EGR control valve 22 is disposed in the EGR passage 21.

Variable valve timing mechanisms 23 and 24, which can independently change the timings for opening/closing the intake valve 7 and the exhaust valve 9 of the engine 1, are coupled to the intake valve 7 and the exhaust valve 9, respectively. An engine control unit (ECU) 25 is connected to those variable valve timing mechanisms 23 and 24. The ECU 25 is designed to control the variable valve timing mechanisms 23 and 24 such that a sealing period in which both the intake valve 7 and the exhaust valve 9 are closed is set around an exhaust top dead center to perform internal EGR for causing burnt gas to remain as internal EGR gas in the combustion chamber 10.

The intake passage 11 is fitted at a position close to the intake port 6 with a temperature sensor 26 for detecting the temperature of intake air. In addition, a revolution number sensor (crank angle sensor) 27 for detecting the revolution number of the engine 1, and a load sensor 28 for detecting the operational state of the engine 1 such as fuel injection amount to output the detected operational state as a load signal are connected to the engine 1. The temperature sensor 26, the revolution number sensor 27, the load sensor 28, the electric motor 16 for the supercharger 17, the bypass control valve 20, and the EGR control valve 22 are connected to the ECU 25.

Next, the operation in this embodiment will be described. When the ECU 25 performs control to start the engine 1, a fuel valve (not shown) disposed upstream of the fuel supply passage 15 opens, and a gaseous fuel such as town gas or the like is sucked into the intake passage 11 from the fuel supply passage 15 due to air flowing through the venturi portion 14 of the intake passage 11, so a mixture of the air and the gaseous fuel is supplied to the engine 1. When the piston 4 starts moving downward from a top dead center, the intake valve 7 opens, so that the mixture is sucked into the combustion chamber 10 through the intake port 6. When the piston 4 then starts moving upward from a bottom dead center, the intake valve 7 closes, so that the pressure and temperature of the mixture in the combustion chamber 10 rise as the piston 4 moves upward. When the temperature of the mixture rises to a predetermined value, the fuel thereby self-ignites to cause combustion in the combustion chamber 10. Owing to this combustion, the piston 4 is pressed downward. With the upward moving of the piston 4 from the bottom dead center, the exhaust valve 9 opens, so that combustion gas in the combustion chamber 10 is discharged to the exhaust passage 12 through the exhaust port 8.

The reciprocating motion of the piston 4 as described above is converted into a revolutional motion of a crankshaft via a connecting rod (not shown), so that an output is obtained from the engine 1.

Figure 2:
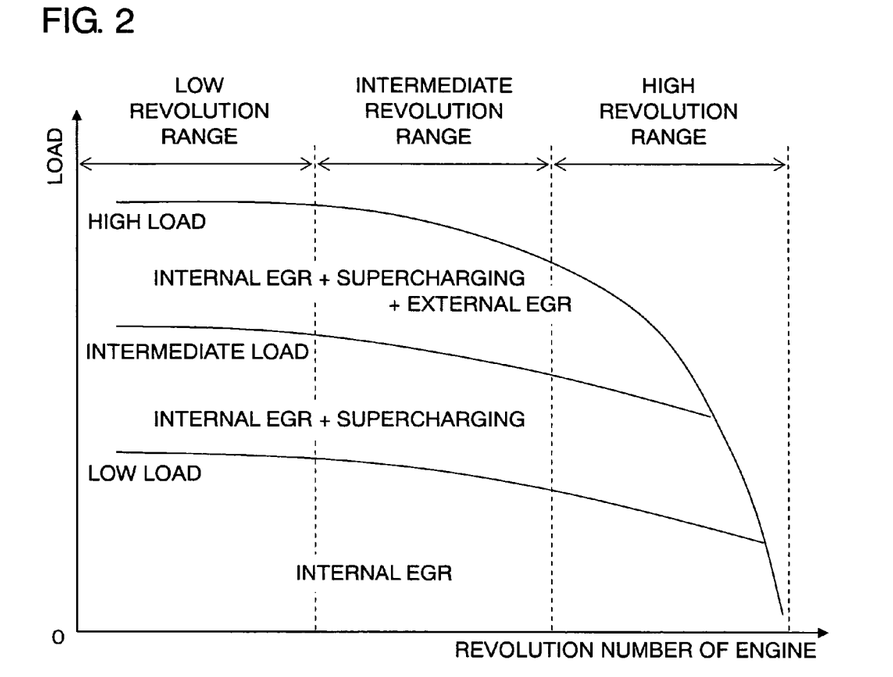
FIG. 2 is a diagram showing a control map.

Here, the ECU 25 calculates a current revolution number of the engine 1 and a required load based on signals from the revolution number sensor 27 and the load sensor 28 at intervals of a predetermined time. The ECU 25, which stores therein in advance, for example, a control map as shown in FIG. 2, collates the calculated revolution number of the engine 1 and the calculated load with the control map to determine whether (A): to only supply internal EGR gas, (B): to supply internal EGR gas while performing supercharging, or (C): to supply internal EGR gas and external EGR gas while performing supercharging. Instead of using the control map, the revolution number of the engine 1 and the load may be applied to a criterial equation stored in advance to determine which one of the aforementioned operations (A), (B), and (C) is to be performed.

In the case of (A), that is, the case of only supplying internal EGR gas during operation in a preset low-load range, the ECU 25 controls the timing for closing the exhaust valve 9 (EVC) by use of the variable valve timing mechanism 24 in accordance with the required load to adjust the amount of internal EGR gas. In this case, supercharging is not performed, so the electric motor 16 is controlled to be held off, and the bypass control valve 20 is opened to open the bypass channel 19. As a result, fresh air passes through the bypass channel 19 to be supplied to the combustion chamber 10. The EGR control valve 22 is fully closed by the ECU 25, so external EGR gas is not supplied to the intake side through the EGR passage 21.

The sealing period in which both the intake valve 7 and the exhaust valve 9 are closed is set before and after the exhaust top dead center, so that high-temperature burnt gas remains as internal EGR gas in the combustion chamber 10. Therefore, the mixture of air and gaseous fuel supplied through the intake port 6 is heated by the internal EGR gas, which achieves improvement in ignitability.

Figure 3A:
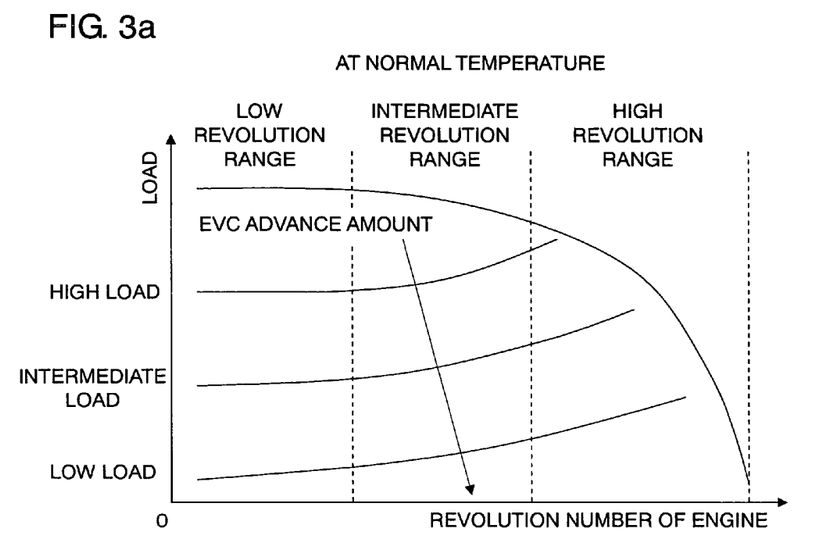
FIG. 3*a* is a graph showing an advance amount of a timing for closing an exhaust valve at normal temperature.

As shown in FIG. 3a, the timing for closing the exhaust valve 9 (EVC) is controlled to be advanced with drops in load and, on the contrary, to be retarded with rises in load. The amount of high-temperature internal EGR gas is thereby increased at low load, so that sufficient compression self-ignition combustion is stably realized even for a lean (rarefied) mixture of air and gaseous fuel. As a result, an improvement in fuel consumption and a reduction in the discharge amount of NOx can be achieved. On the other hand, the amount of high-temperature internal EGR gas decreases with rises in load, therefore the occurrence of knocking can be suppressed.

In the case of (B), that is, the case of performing supercharging in addition to the supply of internal EGR gas during operation in a preset intermediate-load range, the ECU 25 closes the bypass control valve 20 to shut off the bypass channel 19, and drives the electric motor 16 to cause the supercharger 17 to perform supercharging. In this case, external EGR gas is not supplied, therefore the EGR control valve 22 is controlled to be fully closed.

The amount of the mixture supplied to the combustion chamber 10 is limited in accordance with the introduction of internal EGR gas. However, the amount of the air and fuel supplied into the combustion chamber 10 from the intake port 6 increases through a rise in intake pressure resulting from supercharging. In consequence, an improvement in ignitability is achieved.

Figure 4A:
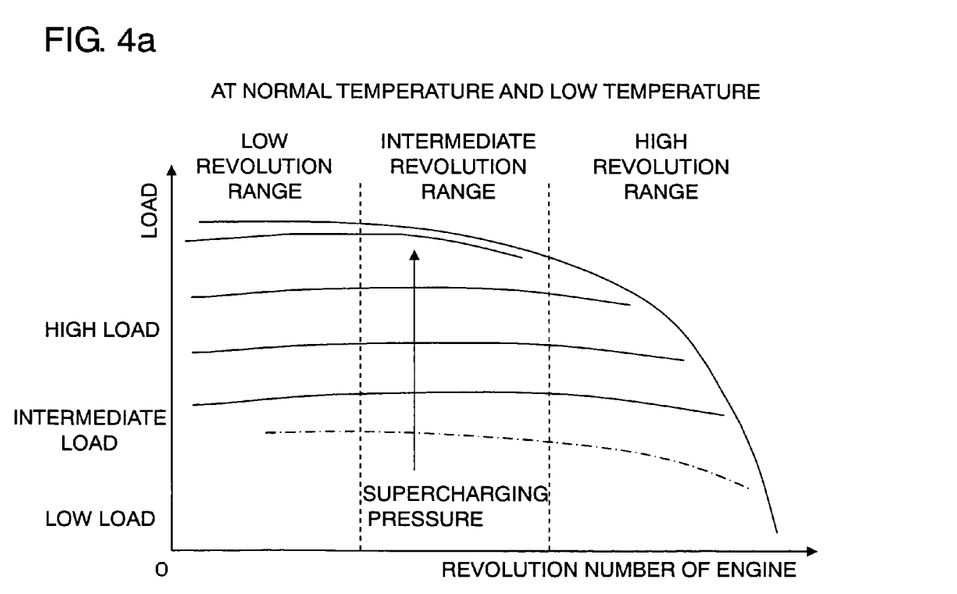
FIG. 4*a* is a graph showing a supercharging pressure at normal temperature and low temperature.

As shown in FIG. 4a, the rotating speed of the electric motor 16 is controlled to be increased with rises in load so as to cause an increase in supercharging pressure.

In the case of (C), that is, the case of supplying external EGR gas in addition to the supply of internal EGR gas and supercharging during operation in a preset high-load range, the ECU 25 performs control to open the EGR control valve 22. Thus, external EGR gas whose temperature is relatively low, is introduced into the intake side via the EGR passage 21, so the ignitability that has been improved too much through the supply of internal EGR gas and supercharging is moderated. As a result, abnormal combustion such as pre-ignition, unstable combustion, and the like is avoided.

Figure 5A:
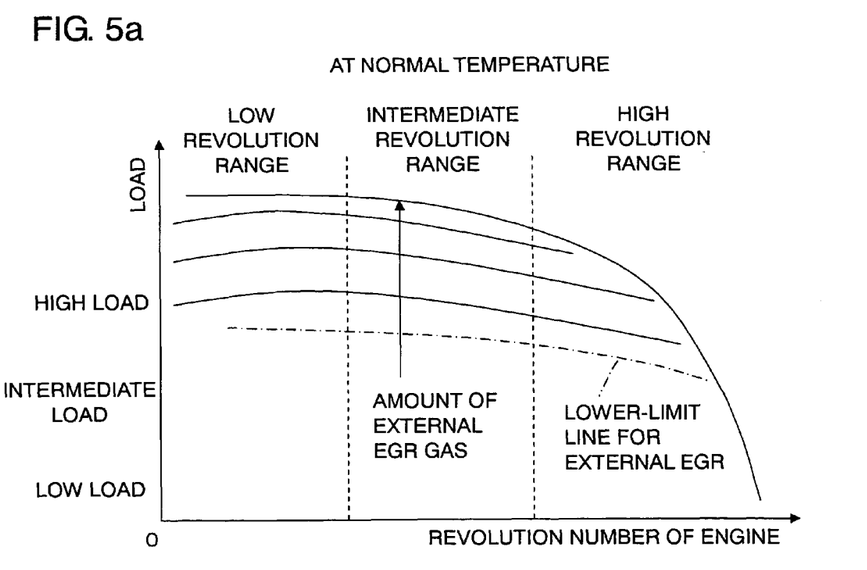
FIG. 5*a* is a graph showing an amount of external EGR gas at normal temperature.

As shown in FIG. 5a, the amount of external EGR gas is controlled to be increased in accordance with rises in load.

Operation is performed at low load, at intermediate load, and at high load as described above. The ECU 25 monitors the temperature of intake air detected by the temperature sensor 26, and adjusts the operation of the engine 1 as follows at low temperature, namely, when the temperature of intake air is lower than a predetermined normal temperature range, and at high temperature, namely, when the temperature of intake air is higher than the predetermined normal temperature range, respectively.

Figure 3B:
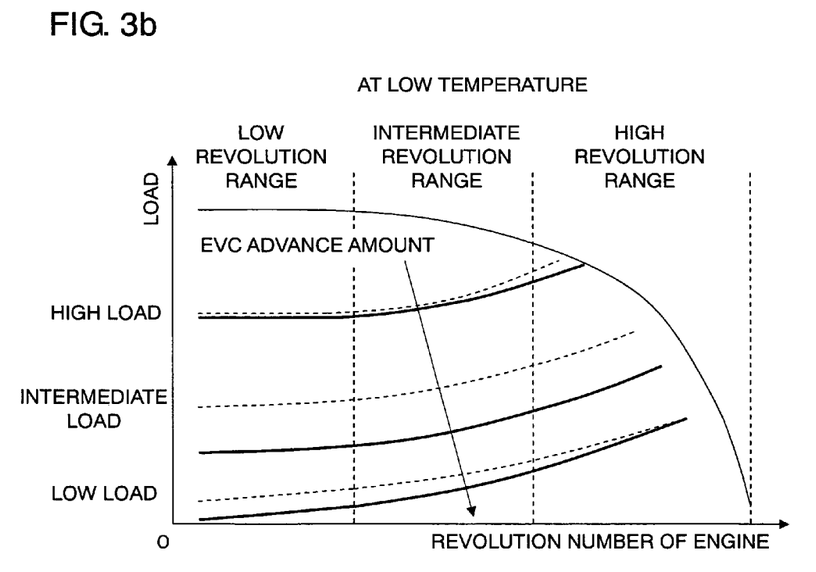
FIG. 3*b* is a graph showing an advance amount of the timing for closing the exhaust valve at low temperature.

First, as shown in FIG. 3b, at low temperature, namely, when the temperature of intake air is lower than the predetermined normal temperature range, the variable valve timing mechanism 24 is controlled such that the timing for closing the exhaust valve 9 (EVC) is adjusted to an advance side. Thus, the amount of high-temperature internal EGR gas is increased, so the temperature in the combustion chamber 10 is prevented from dropping. As a result, stable self-ignition combustion is realized.

However, at low load, the advance amount of the timing for closing the exhaust valve 9 (EVC) is made smaller than that at intermediate load in which supercharging is performed, with a view to securing a certain amount of fresh air. In addition, when the revolution number of the engine is in a preset high-revolution range at low load, the timing for closing the exhaust valve 9 (EVC) is advanced by substantially the same amount as that of at normal temperature, thereby securing a certain amount of fresh air.

Figure 5B:
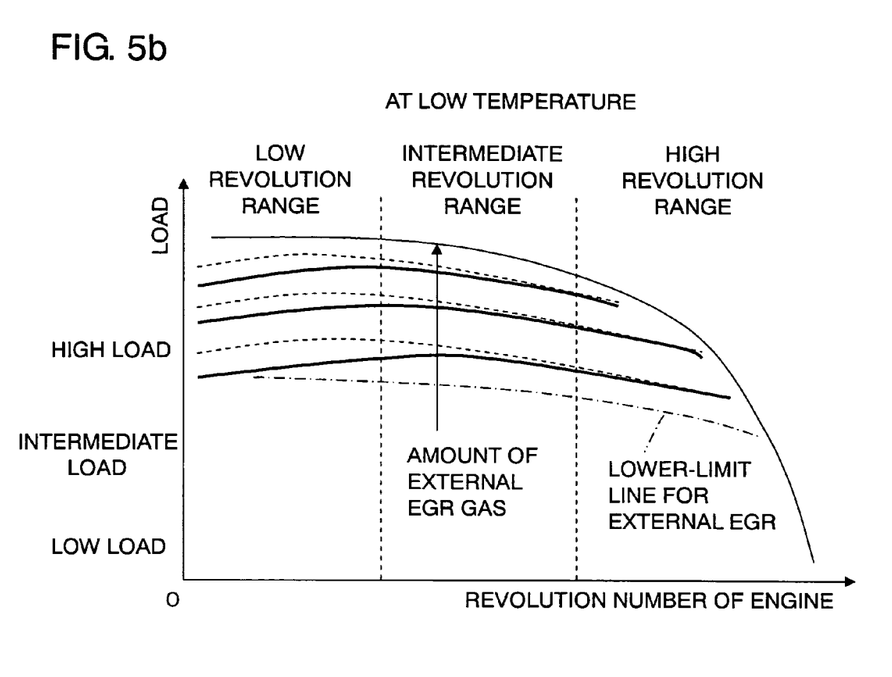
FIG. 5*b* is a graph showing an amount of external EGR gas at low temperature.

In the high-load and high-revolution range, in which external EGR gas is supplied in addition to the supply of internal EGR gas and supercharging, the timing for closing the exhaust valve 9 (EVC) is adjusted to the advance side to increase the amount of internal EGR gas, with a view to ensuring ignitability. When the revolution number of the engine is in a preset low-revolution range at high load, the opening degree of the EGR control valve 22 is controlled so as to reduce the amount of external EGR gas as shown in FIG. 5b, with a view to securing a certain torque.

Figure 3C:
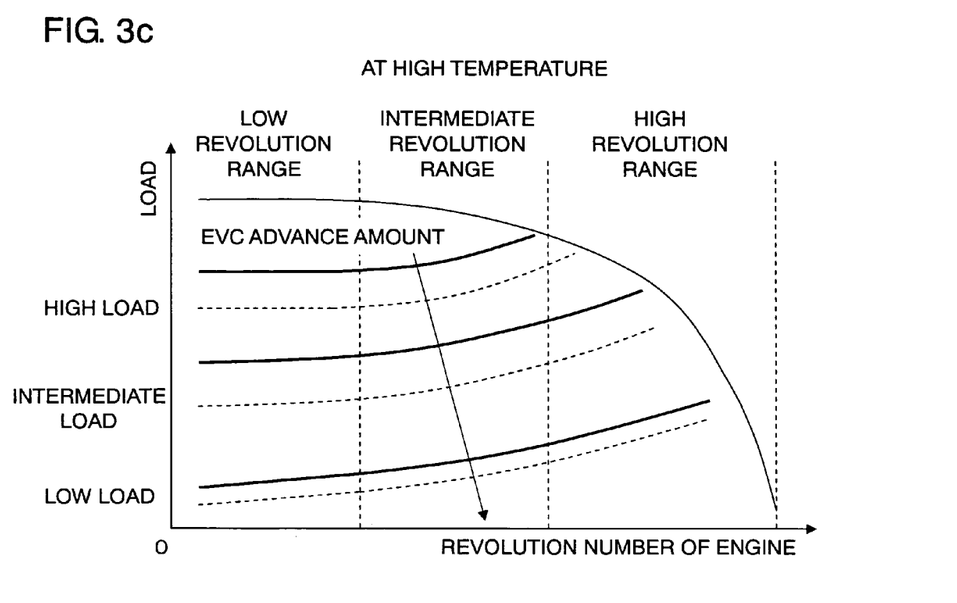
FIG. 3*c* is a graph showing an advance amount of the timing for closing the exhaust valve at high temperature.

Meanwhile, at high temperature, namely, when the temperature of intake air is higher than the predetermined normal temperature range, the variable valve timing mechanism 24 is controlled such that the timing for closing the exhaust valve 9 (EVC) is adjusted to a retard side as shown in FIG. 3c. Thus, the amount of high-temperature internal EGR gas is reduced so that the occurrence of pre-ignition is obviated.

Figure 4B:
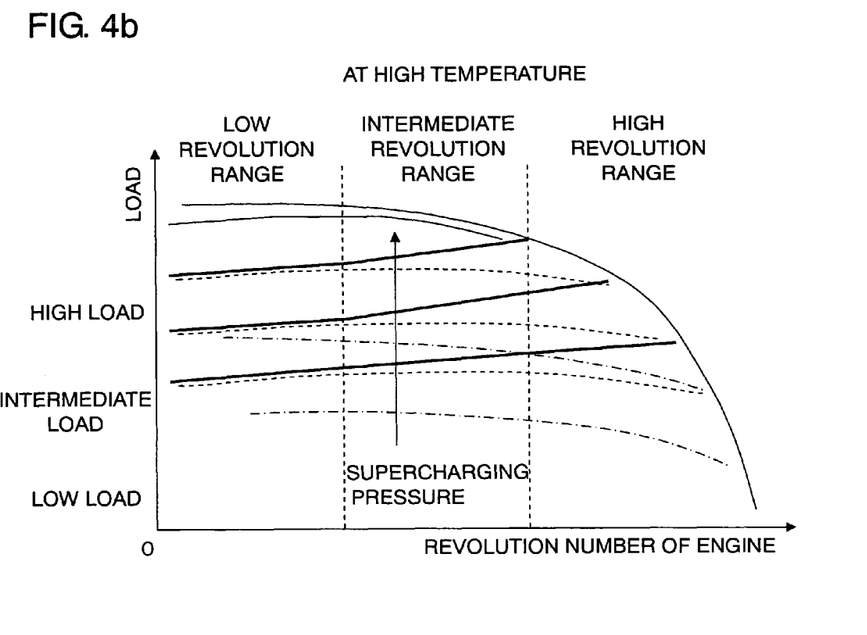
FIG. 4*b* is a graph showing a supercharging pressure at high temperature.

However, at intermediate load, with a view to compensating for a decrease in volumetric efficiency resulting from a high temperature of intake air, the retard amount of the timing for closing the exhaust valve 9 (EVC) is made larger than that at low load, thereby reducing the amount of internal EGR gas. In addition, at intermediate load, and in the intermediate-revolution range or the high-revolution range in which the revolution number of the engine is relatively high, the rotating speed of the electric motor 16 is increased to cause a rise in supercharging pressure as shown in FIG. 4b. Thus, ignitability is ensured as a result of an increase in density, and combustion is softened to restrain combustion noise from being generated as a result of an increase in heat capacity caused by an increase in the amount of air.

Figure 5C:
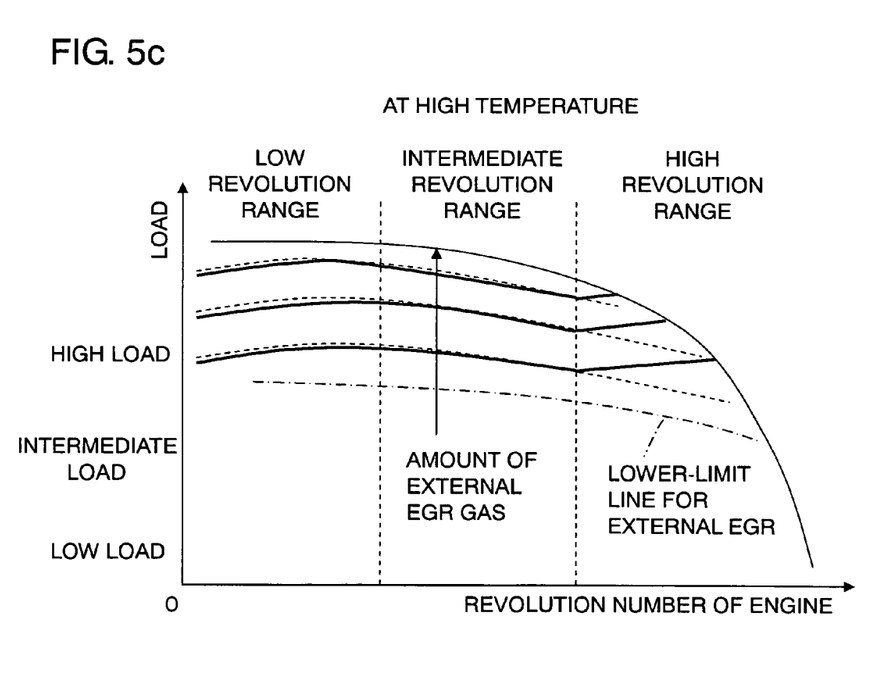
FIG. 5*c* is a graph showing an amount of external EGR gas at high temperature.

At high load, control is performed substantially in the same manner at intermediate load such that the retard amount of the timing for closing the exhaust valve 9 (EVC) is increased, and that the supercharging pressure is raised in the intermediate-revolution range and the high-revolution range. However, in the high-revolution range, which is accompanied by harsh combustion noise, with a view to ensuring ignitability and softening combustion at the same time, the opening degree of the EGR control valve 22 is controlled so as to increase the amount of external EGR gas, as shown in FIG. 5c. That is, during operation in the high-revolution/high-load range, the electric motor 16 for the supercharger 17 and the EGR control valve 22 are controlled such that the supercharging pressure rises and the amount of external EGR gas increases as the temperature of intake air detected by the temperature sensor 26 rises.

As described above, the supercharger is used in conjunction with internal EGR to make it possible to enlarge an operational range enabling the utilization of internal EGR, namely, an operational range in which the performance of control through internal EGR is possible while securing an amount of fuel supply corresponding to a load. With the aid of external EGR for softening combustion, the generation of combustion noise can be suppressed in the high-revolution/high-load range. In particular, for changes in the temperature of intake air in the high-revolution/high-load range, the above-mentioned means are combined with one another to make it possible to ensure ignitability and soften combustion at the same time, that is, to suppress the generation of combustion noise while maintaining a suitable ignition timing.

Thus, from the intermediate-revolution/intermediate-load range to the high-revolution/high-load range as well, it is possible to perform stable premixed compression self-ignition combustion or the control thereof in accordance with the temperature of intake air. As a result, the operational range allowing premixed compression self-ignition combustion can be enlarged.

The foregoing embodiment of the present invention can be modified in a range within the gist of the present invention. For example, although town gas is used as fuel in the foregoing embodiment, another gaseous fuel such as LPG or CNG may be adopted. Alternatively, a liquid fuel such as light oil or gasoline can be used. A fuel injection nozzle or the like as well as the venturi portion can be selected as required, as means for supplying the gaseous fuel into the intake passage. The supercharger of the variable supercharging pressure type is not limited to the supercharger designed to be driven by the electric motor. For instance, a so-called turbo of a variable vane type, which controls the flow of exhaust gas colliding with a turbine to perform the control of rotating speed, may also be employed.

The invention claimed is:

1. A control apparatus for a combustion engine of a premixed compression self-ignition type, for compressing a mixture of a fuel and an oxygen-containing gas in a combustion chamber to cause combustion thereof through self-ignition, and setting a sealing period during which both an intake valve and an exhaust valve are closed around an exhaust top dead center to cause burnt gas to remain as an internal EGR gas in the combustion chamber, the control apparatus comprising:

a temperature sensor for detecting a temperature of intake air;

a revolution number sensor for detecting a revolution number of the combustion engine;

a load sensor for detecting an operational state of the combustion engine to output the detected operational state as a load signal;

a supercharger of a variable supercharging pressure type disposed in an intake passage;

an external EGR mechanism for recirculating part of exhaust gas in an exhaust passage as an external EGR gas to the intake passage at a position upstream of the supercharger; and a control unit for grasping a current revolution number and a current magnitude of a load based on a signal from the revolution number sensor and a signal from the load sensor, respectively, and controlling the supercharger and the external EGR mechanism such that a supercharging pressure rises and an amount of the external EGR gas increases as a temperature of intake air detected by the temperature sensor rises when it is determined that the combustion engine is operated in a preset high-revolution/high-load range.

2. A control apparatus for a combustion engine of a premixed compression self-ignition type according to claim 1, wherein the control unit controls the external EGR mechanism such that the amount of the external EGR gas decreases when the temperature of intake air detected by the temperature sensor is lower than a normal temperature and the combustion engine is operated in the high-load range.

3. A control apparatus for a combustion engine of a premixed compression self-ignition type according to claim 1, wherein the external EGR mechanism includes an EGR passage through which the exhaust passage communicates with the intake passage at a position upstream of the supercharger, and an EGR control valve disposed in the EGR passage to open/close the EGR passage, the control unit opening/closing the EGR control valve to adjust the amount of the external EGR gas.

4. A control apparatus for a combustion engine of a premixed compression self-ignition type according to claim 1, further comprising:

a bypass channel through which an upstream side and a downstream side of the supercharger communicate with each other; and a bypass control valve disposed in the bypass channel to open/close the bypass channel, the control unit opening the bypass control valve to open the bypass channel when supercharging is not performed.

5. A control apparatus for a combustion engine of a premixed compression self-ignition type according to claim 1, further comprising a variable valve timing mechanism for adjusting timings for opening/closing the exhaust valve, the control unit controlling the variable valve timing mechanism such that timing for closing the exhaust valve is adjusted to an advance side when the temperature of intake air detected by the temperature sensor is lower than a normal temperature, and that the timing for closing the exhaust valve is adjusted to a retard side when the temperature of intake air detected by the temperature sensor is higher than the normal temperature.

6. A control apparatus for a combustion engine of a premixed compression self-ignition type according to claim 5, wherein the control unit controls the variable valve timing mechanism such that an advance amount of the timing for closing the exhaust valve becomes smaller during operation in a preset low-load range than during operation in a preset intermediate-load range when the temperature of intake air detected by the temperature sensor is lower than the normal temperature.

7. A control apparatus for a combustion engine of a premixed compression self-ignition type according to claim 5, wherein the control unit controls the variable valve timing mechanism such that a retard amount of the timing for closing the exhaust valve becomes larger during operation in a preset intermediate-load range than during operation in a preset low-load range when the temperature of intake air detected by the temperature sensor is higher than the normal temperature.

* * * * *